3,549,501
RECOVERY OF PEPSIN FROM LININGS OF PIG STOMACHS

Jack C. Trautman and Floyd C. Olson, Madison, Wis., assignors to Oscar Mayer & Co., Inc., Chicago, Ill., a corporation of Illinois
No Drawing. Filed Apr. 25, 1968, Ser. No. 724,228
Int. Cl. C07g 7/026
U.S. Cl. 195—66                                    11 Claims

ABSTRACT OF THE DISCLOSURE

Comminuted linings of pig stomachs are extracted to provide pepsinogen extractions or solutions. The extractions are activated by addition of acid to give a pH of 1.5 to 3.5 (1.9 to 2.3 preferred). It is critical that the acid be added quickly in less than 10 minutes and preferably within not more than 45 seconds. After being held for at least about 5 minutes at 80 to 120° F. the pH of the extraction is desirably raised to 2.0 to 6.0 (2.5 to 3.0 preferred). After standing for from 30 minutes to 24 hours at 32 to 105° F. an enzyme (i.e. pepsin) solution is separated from the sludge which contains little enzymatic activity. The enzyme solution may be filtered to desired clarity and then concentrated and, if desired, dried.

---

The object of this invention, generally stated is an improved method of recovering pepsin from the linings of pig or hog stomachs characterized by substantially increased yields of a quality product.

The general procedure of the invention comprises, extracting pepsinogen from the pig stomach linings, activation of pepsinogen in the extraction solution, and separation of the pepsin.

(A) EXTRACTION OF PEPSINOGEN

Hog stomach linings are comminuted such as by grinding in the frozen or thawing condition through a grinder plate having openings up to one inch in diameter and preferably between 1/16 to 1/8 inch in diameter. Water, or water and ice, are added to the comminuted linings in the ratio of 1/2 to 25 parts by weight of the water and ice to each part by weight of the linings. The preferred ratio is from 6 to 10 parts of the water and ice. The temperature of the resulting mixture should be between 30 to 100° F. and preferably between 32 to 45° F. The pH of the mixture should be between 5.5 to 8.0 and preferably between 7.0 to 7.5.

After 10 minutes to 24 hours, and preferably after between 1 to 12 hours, the mixture is centrifuged in a disc centrifuge or other suitable type of separating equipment to obtain a pepsinogen solution or extraction and a residue of insoluble stomach linings. Usually each part by weight of the residue from the first extraction is treated with from 1 to 10 parts by weight (3-4 preferred) of water, or water and ice, within the same broad and preferred temperature and pH ranges useful in conducting the first extraction. The time of the second extraction also ranges from 10 minutes to 24 hours but the preferred time is one hour before centrifuging.

If desired there may be a third extraction of the insoluble residue from the second extraction. The pepsinogen extractions or solutions from the first, second and third extractions are combined or pooled for activation treatment.

(B) ACTIVATION OF PEPSINOGEN

To the combined extraction solutions sufficient acid (e.g. hydrochloric acid) is added to adjust the pH thereof to between 1.5 to 3.5, and preferably between 1.9 to 2.3. It is essential that the acid be added and mixed rapidly so that the desired pH is obtained uniformly throughout the solution within 10 minutes, and preferably within 30 to 45 seconds. This rapid addition prevents pepsin from precipitating on the protein and accounts for substantially increased yields of 20 to 80 percent over conventional methods of recovery. After addition of the acid the solution is heated to between 80 to 120° F. and preferably between 95 to 105° F. If desired the order of these heating and rapid acid-addition steps may be reversed.

After the pH of the solution has been rapidly adjusted and the solution heated, it is held at the desired temperature between 80 to 120° F., and preferably between 95 to 105° F., for from 5 minutes to 10 hours. The preferred holding time is from 10 to 15 minutes. Then, because of improved yields obtainable, it is usually desirable to increase the pH of the solution to between 2.0 to 6.0, and preferably between 2.5 to 3.0, by the addition of a suitable reagent such as sodium bicarbonate.

(C) SEPARATION OF PEPSIN

The product from the foregoing activation of pepsinogen is held from 30 minutes to 24 hours at between 32 to 105° F. in a conical tank which promotes separation into a supernatant layer which may be decanted and a settlings layer which has little enzymatic activity and is discarded. Alternatively, the product from the activation of pepsinogen may be held for 30 minutes to 24 hours at between 32 to 105° F. in a non-conical tank and then centrifuged to separate the settlings as sludge which has little enzymatic activity.

The decanted or centrifuged enzyme solution is filtered to desired clarity and then concentrated in known manner. If desired the concentrated enzyme (pepsin) may be dried and standardized.

OPTIONAL VARIATION IN GENERAL PROCEDURE

If desired the foregoing general procedure may be varied so as to separate or recover the mucin from the pooled or combined extractions of operation (A) Extraction of Pepsinogen. The pH of the combined extractions of pepsinogen is lowered to between 3.5 to 4.5 and preferably to 4.0. Thereupon most of the pepsinogen becomes insoluble and settles while the mucin remains in the solubles. The insolubles containing the pepsinogen are separated by settling or centrifuging. Water is added to the insolubles in an amount equal to from 5 to 50 percent (preferably 10 percent) by weight of the pooled or combined extractions. The resulting solution of pepsinogen is the process as above described under (B) Activation of Pepsinogen and (C) Separation of Pepsin.

This alternative procedure has the advantages of yielding pepsin of higher purity, substantially reducing the amount of water to be evaporated, and recovery of the crude mucin.

WORKING EXAMPLE 800 pounds of frozen hog stomach linings are ground through a plate having 1/8 inch openings. 6400 pounds of ice and water are added to the ground linings resulting in a suspension having a temperature of 35° F. which is stirred for one hour. The mixture is centrifuged to yield a first pepsinogen extraction and insolubles.

To the insolubles 2400 pounds of ice and water are added to obtain a suspension having a temperature of 35° F. which is stirred for one hour. The mass is centrifuged and the resulting second pepsinogen extraction is combined with the first pepsinogen extraction. The insolubles are discarded.

The pooled or combined pepsinogen extractions is warmed to 102° F. in about 60 minutes. Then 44 pounds of 7.7 normal hydrochloric acid are added to the warmed pepsinogen extractions, with stirring or other rapid blending techniques, so that the entire pepsinogen solution is uniformly at a pH of 2.0 within 30 to 45 seconds. Then sufficient sodium bicarbonate is added to adjust the pH to 2.75 and the mass is allowed to stand in a conical tank for 6 hours.

The supernatant pepsin solution is then decanted and filtered and dried in known manner. A typical yield is from 5 to 5.5 pounds equivalent of 1:10,000 pepsinogen per 100 pounds of linings. The typical dry solids activity is from 1:5,500 to 1:7,000.

What is claimed as new is:

1. The method of recovering pepsin from the linings of hog stomachs which comprises the following steps: (1) extracting pepsinogen from said linings in from about ½ to 25 parts by weight of water per part by weight of linings at a temperature not exceeding about 100° F. and pH between about 5.5 and 8.0 for at least about 10 minutes, (2) separating the pepsinogen solution from the residue of insoluble stomach linings, (3) adding acid to said pepsinogen solution so as to adjust the pH thereof between about 1.5 to 3.5 in not more than about 10 minutes, (4) holding the temperature of said solution to between about 80 to 120° F. at least about 5 minutes, (5) holding the mixture about 30 minutes to 24 hours at between about 32 to 105° F., and (6) separating the solids in said mixture from the pepsin-containing solution.

2. The method of claim 1 wherein the order of steps (3) and (4) is reversed.

3. The method of claim 1 wherein the hog stomach linings are first comminuted so as to pass through a grinder plate having openings not exceeding about one inch in diameter.

4. The method of claim 1 wherein after step (4) and before step (5) said solution after standing for at least about 5 minutes has the pH thereof increased to between about 2.0 to 6.0.

5. The method of claim 4 wherein the hog stomach linings are first comminuted by grinding through a plate having openings ranging from about $\frac{1}{16}$ to $\frac{1}{8}$ inch in diameter, said step (1) is carried out in about 6 to 10 parts by weight of water per part by weight of linings at a temperature between about 32 to 45° F. and at a pH between about 7.0 to 7.5 in about 1 to 12 hours, said step (3) is carried out at a pH between about 1.9 to 2.3 in not exceeding about 45 seconds, said step (4) is carried out between about 95 to 105° F., and within about 10 to 15 minutes after step (4) and before said step (5) the pH of said solution is raised to between about 2.5 to 3.0.

6. The method of claim 5 wherein the order of steps (3) and (4) is reversed.

7. The method of claim 1 wherein the residue from said step (1) is extracted with from about 1 to 10 parts by weight of water per part by weight of residue at a temperature not exceeding about 100° F. and at a pH between about 5.5 and 8.0 for at least about 10 minutes, the pepsinogen solution is separated from said residue and combined with the pepsinogen solution from said step (2).

8. The method of claim 1 wherein said step (6) is carried out in a conical tank and the pepsin containing solution is decanted from the settled solids.

9. The method of claim 1 wherein said pepsin-containing solution from said step (6) is concentrated.

10. The method of claim 1 wherein the pH of said pepsinogen solution from said step (2) is lowered to between about 3.5 to 4.5, the resulting insolubles containing most of the pepsinogen are separated from the solution containing most of the mucin, from between about 5 to 50 percent of water is added to said insolubles based on the weight thereof, and the resulting solution is processed in accordance with said steps (3) through (6) of claim 1.

11. The method of claim 10 wherein the pH of said pepsinogen solution from said step (2) is lowered to about 4.0 and about 10 percent by weight of water is added to said insolubles.

References Cited
UNITED STATES PATENTS 2,701,228  2/1955  McKerns _____ 195—66
3,220,931  11/1965  Munns et al. _____ 195—66

LIONEL M. SHAPIRO, Primary Examiner